United States Patent Office 3,457,946
Patented July 29, 1969

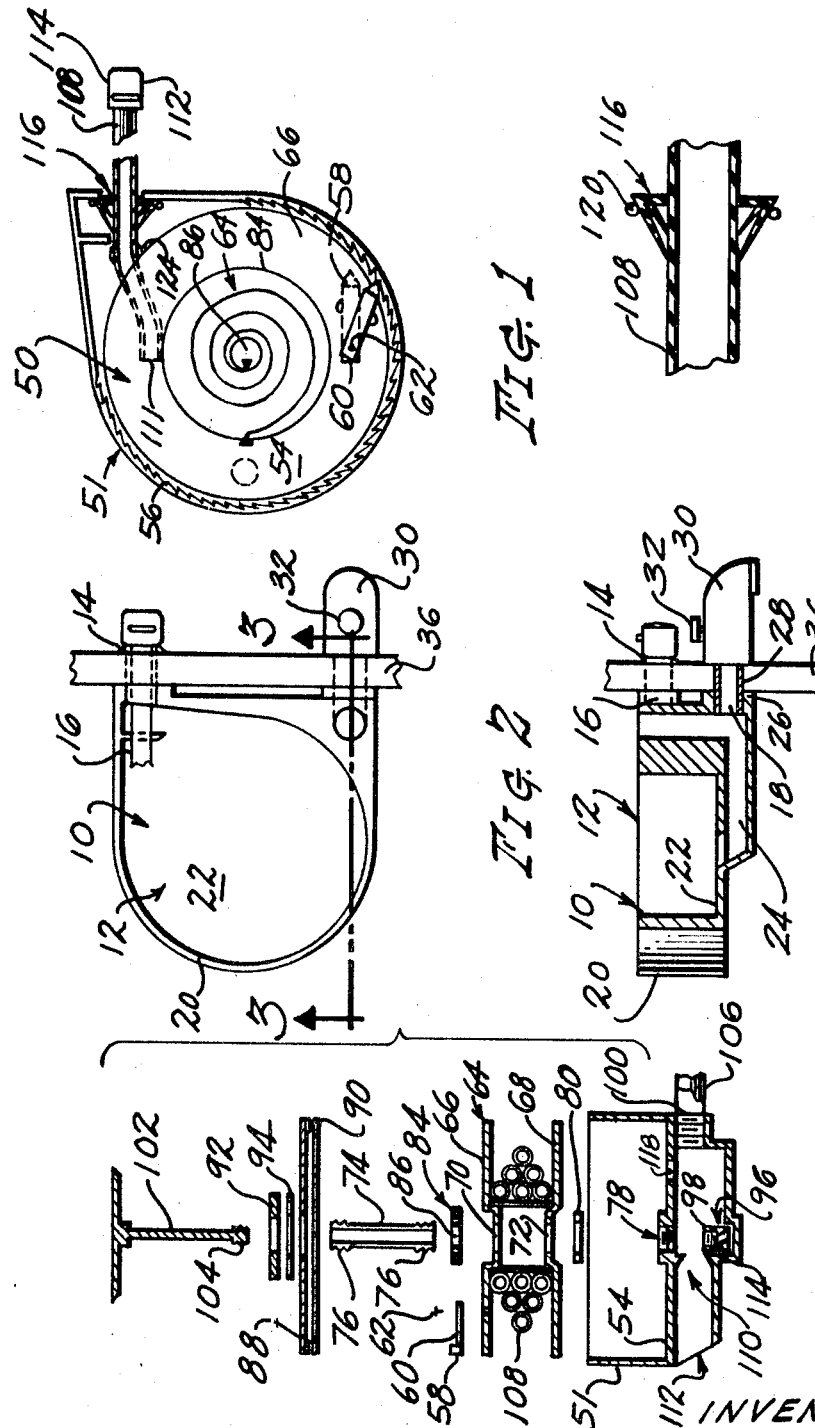

3,457,946
HOSE REEL IN CONTAINER
Raiford P. Dean, Jr., 1599 Ocala Ave. SW., Atlanta, Ga. 30311, and Farlan Kirk, 1207 Rosedale Road NE., Atlanta, Ga. 30306
Filed Feb. 27, 1967, Ser. No. 618,579
Int. Cl. B65h 75/46, 75/48; F16l 3/20
U.S. Cl. 137—355.26                                   10 Claims

ABSTRACT OF THE DISCLOSURE

An extensible and retractable, flexible utility hose and reel for use in the bathroom and like and which attaches to the diverter outlet of the waterline and having the hose and reel and recoil spring mounted inside a fluid tight housing which is filled with water that enters the open inner end of the hose which is sealed inside the housing.

---

The field of the invention is recoiling or retractable hose mounted with a spray operated recoil reel and including a means for attaching the inlet of the hose to a fluid pressure line such as a water pipe.

Prior art devices such as found in U.S. Patents Nos. 1,675,140; 1,794,825; and others, disclose that the general arrangement of a hose and hose reel that is spring operated to retract or recoil and which is connected to a fluid line is generally well known. The problem of introducing the fluid under pressure, such as water in the bathroom under city water pressure, into the end of the hose will appear from a careful study of the prior art and it may be noticed that the usual treatment of this is to introduce the fluid under pressure through the middle or inside of the reel in some manner. This requires some type of rotating fluid coupling or other substitute apparatus which is not entirely satisfactory and may not be the least expensive and most economical approach to the matter. The present device unlike many prior art devices introduces the fluid under pressure into a closed housing in which is mounted the retractable reel and spring mechanism.

Generally described, without restriction on the scope of the invention as defined in the appended claims, a normally closed reel and fluid container housing is provided with a fluid inlet normally closed by a valve sometimes referred to as a diverter when used in conjunction with the usual faucet outlet on a bathtub. A circular hose reel is mounted inside the normally fluid type housing on a center shaft on which is mounted a rewind or recoil spring having one end attached to the center and the other end operated on the unwinding of the reel. Washers and bearings may be provided. Also a rubber gasket or seal may be provided where needed to reduce the possibility of leakage. The hose operates through an outlet which is suitably closed by means of a rubber hose seal and the details of this will be described and shown. The reel is locked in selected position by means of a centrifugal reel lock or dog engaging a tooth.

Other and further objects and advantages of my invention will become apparent upon reading the following and more detailed description taken in conjunction with the accompanying drawings, in which:

FIG. 1 is a cross-sectional, plan view through the device with the hose extended and part thereof broken away.

FIG. 2 is a top plan view of a modified form of the invention with the cover removed.

FIG. 3 is a cross-sectional view taken substantially along lines 3—3 in FIG. 2.

FIG. 4 is a vertical cross-sectional assembly view of the device in FIG. 1 with the parts in disassembled relationship.

FIG. 5 is a cross-sectional view through the rubber hose seal.

Referring initially to the embodiment shown in FIGS. 1 and 4, and then as the discussion proceeds to the other figures of the drawings, the device is designated generally and overall by reference numeral 10 and comprises a container-type housing which is designated generally by reference numeral 12 and which may be manufactured in one or several pieces from plastic, metal or the like by molding, forming or otherwise. Housing 12 is normally closed and is fluid tight when being used, there being an opening 14 through which a hose 16 extends and retracts and another opening 18 through which the fluid is introduced from any source of supply such as a household water system in a bathroom or kitchen or the like. Housing 12 has a generally cylindrical casing 20, a flat bottom 22 and is provided with an internal channel 24 leading to a pipe connection 26 which may be connected by means of a pipe nipple 28 with a standard faucet 30 having a conventional diverter plunger operator 32 thereon by means of which water coming through the waterline (not shown) to the faucet 30 may be diverted through the nipple 28 into the passage 24. The entire assembly shown in FIGS. 2 and 3 may be mounted through a wall section 36 in a bathroom.

The form of the housing 12 just described is suitable for use with a water system and faucet 30 which has a built-in diverter 32.

The form of the invention and the housing shown in FIGS. 1 and 4 includes a diverter which may be used if one like that shown and described in connection with FIGS. 2 and 3 is not available.

The embodiment shown in FIG. 1, designated generally by reference numeral 50 includes a housing 51 which may be attached in place anywhere, such as a wall surface on a bathroom or barbershop or the like, and is not necessarily connected with the existing faucet 30 or diverter arrangement 32 shown in FIGS. 2 and 3 since the embodiment shown in FIGS. 1 and 4 has its own fluid diverter 96. Housing 51 is generally cylindrical in formation with a cylindrical body and a flat bottom 54. Teeth 56 are formed around the internal periphery of the housing 51 to be engaged selectively by the pointed end 58 of a dog or latch or hose reel lock 60 which is pivotly mounted at 62 to the reel housing 50. A reel 64 has a pair of opposed side plates 66, 68 separated by a central, tubular center 70 provided with an opening 72 to receive a reel shaft 74 having threaded ends 76, one of which is screwed into a bottom threaded portion 78 in the bottom 54 of housing 51. A thrust bushing 80 is interposed between the center 70 of the reel 66 and the threaded portion 78 in the bottom 54 of housing 50.

A rewind or recoil spring 84 constructed from a single coiled and convoluted flat, steel spring has an open center portion 86 through which the shaft 74 is inserted and spring 84 has one internal end attached to the shaft 74 and the external end attached to the reel 64 to be actuated thereby. A housing cover 88 is attached in place on the housing 51 securely and fluid tight thereon against a gasket 90 made from rubber, plastic or the like, by means of a cover nut 92 fitting against a washer 94.

The fluid diverter 96 in the device of FIGS. 1 and 4 is compirsed of the diverter valve having a valve member or diverter 98, which may be manually raised in the path of fluid entering through an opening 100 by means of a diverter plunger designated generally by reference numeral 102 which extends through the middle of reel shaft 74 and has a threaded end 104 which screws into diverter portion 98. Fluid is introduced selectively by means of an external control valve (not shown, but of a conventional nature) through fluid pressure line 106 and opening 100 into passage 110. As long as diverter or the member 98 is in lowered position, fluid passes over diverter 98 and continues out open end 112 of passage 110, thus utilizing passage 110 as a spout for normal filling of a tub, basin or the like. Upon manually raising diverter 98 by means of plunger 102, the fluid pressure builds up on the diverter 98 and under diverter 98 in chamber 114 thereby resisting movement of the diverter 98 to "open" position. With diverter 98 in said raised position, fluid passage 110 is blocked and fluid builds up under pressure in the area designated generally as that portion of passage 110 between diverter 98 and opening 100, further causing fluid to enter housing 51 under pressure through opening 118, filling housing 51 with the fluid.

A rubber hose 108 of any suitable length has one open end 111 attached to the reel center portion 70 and therefore is open to receive any fluid which enters through the diverter arrangement 96 and the opening 100. The outward, terminal and exterior end of the hose 112 is provided with a shower nozzle 114 or the like and operates through a frusto-conical hose seal 116 which is made from rubber or the like and tightly fits around the hose 108. The rubber seal 116 is held in place by a pair of fasteners 120 which may be removed from the housing 50 and the seal 116 may be replaced if it becomes worn and shows signs of leaking.

The operation of the forms of the device shown in FIGS. 1 and 2 is exactly the same and the difference, as pointed out in the beginning, is only in the modification of the housing for use with a bathroom or the like having a diverter 32 eliminating the need for the built-in diverter arrangement 96 of the form shown in FIGS. 1 and 4. It is to be understood that the internal construction of the form shown in FIGS. 1 and 2 are alike and the same arrangement of the hose reel 64, a hose, a coilspring arrangement 84, and other parts of the invention are the same. Also, the form of the invention in FIG. 2 is provided with a latch 58.

In the operation of the device, of course, as long as the device is not in use and inoperative, there is no fluid pressure within housing 50 (or housing 12) and the fluid or the liquid inside is not under pressure and will not leave the hose. When it is desired to place the device in operation, as for instance when being used in a bathroom and it is needed to wash the hair, to wash a small child or a dog or the like, the diverter 32 in FIG. 3, or the diverter plunger 102 in FIG. 4, is actuated to cause the fluid from the lines 28 or 106 to enter into the respective housing 12 or 50. The hose 108 is pulled manually causing the reel 64 to turn on the shaft 74 and the hose 108 may be extended to whatever length is desired. Releasing the hose and causing the reel 64 to move will actuate the latch 58 to hold the hose in whatever position is desired. Fluid which enters through the opening 100 or the passage 24 will fill the interior of the respective housing 12 or 50 with fluid under pressure which enters the open end of the hose 111. Extending the hose 108 has caused the recoil spring 84 to be wound which will return the hose to coiled and reeled condition when the hose is released. A metal band 124 may be placed on the hose 108 near the inside end 111 to prevent the hose 108 from being withdrawn from the opening 116 beyond a certain safe point.

What is claimed:
1. In a hose reel device which includes a flexible hose, such as a rubber or plastic water hose, and a means such as a reel for storing said hose for extension and retraction, together with a means for returning said hose after extension, and a fluid supply having inlet and outlets with a valve for diverting the fluid for supply to the hose:
  (a) a normally closed, fluid-tight housing having said hose stored and retracted therein on said means such as a reel in said housing and said hose being extensible through a housing opening in said housing, there being means at said opening for preventing fluid from escaping therefrom,
  (b) said housing having a fluid entrance connected with said inlet through which fluid is selectively admitted to said housing by actuation of said valve, said hose being operable in fluid tight communication with said housing opening,
  (c) and said hose having one end inside said housing open to receive fluid therein when said housing is receiving fluid through the valve.

2. The device claimed in claim 1, wherein:
said housing has means thereon for attachment to a conventional plumbing fixture and said diverter valve is a conventional part of the plumbing fixture for diverting water from the tub to the shower.

3. The device claimed in claim 1, wherein:
said housing has a passageway therein connected to a fluid supply and said entrance being in said passageway for fluid to pass therethrough, said diverter valve on said housing being operable in said passageway selectively to divert the fluid through said fluid entrance.

4. The device claimed in claim 3, wherein:
said diverter valve includes a passage closing member operable in said passageway, an operating member mounted on said housing, a control means outside said housing to said member in said passageway, and means holding said passage closing member in place.

5. The device in claim 4, wherein said hose is wound on said reel inside said housing and said diverter valve passage closing member is operated by a means through the center of said reel.

6. The device in claim 1, wherein said housing has a passageway from said fluid entry into said housing through an opening and said passageway also is in communication with an outlet leading to the diverter valve.

7. The device in claim 1, wherein said means for preventing fluid from escaping includes a flexible member of rubber, plastic and the like surrounding said hose and attached in place in the opening for the hose.

8. The device in claim 7, wherein said flexible member includes a tapered portion.

9. The device in claim 1, wherein said housing is a closed container open inside to receive a reel therein, said fluid entrance leading directly to said opening inside of said container.

10. The device in claim 1, wherein said open, inside end of said hose is attached to the center of said reel.

References Cited

UNITED STATES PATENTS 2,997,722   8/1961   Pearson _____ 4—191
1,524,172   1/1925   Dewey _____ 137—355.23 X
1,675,140   6/1928   Schenderlein _____ 242—107.7

WALTER A. SCHEEL, Primary Examiner

J. P. McINTOSH, Assistant Examiner

U.S. Cl. X.R.

4—1; 137—355.23